United States Patent [19]

Maeda et al.

[11] Patent Number: 5,606,016
[45] Date of Patent: Feb. 25, 1997

[54] PROCESS FOR PREPARING COLORLESS ROSINS

[75] Inventors: Masao Maeda; Yukiharu Yamada; Yutaka Koba, all of Osaka, Japan

[73] Assignee: Arakawa Kagaku Kogyo Kabushiki Kaisha, Osaka, Japan

[21] Appl. No.: 373,222

[22] PCT Filed: May 16, 1994

[86] PCT No.: PCT/JP94/00792

§ 371 Date: Jan. 18, 1995

§ 102(e) Date: Jan. 18, 1995

[87] PCT Pub. No.: WO94/26833

PCT Pub. Date: Nov. 24, 1994

[30] Foreign Application Priority Data

May 18, 1993 [JP] Japan ................ 5-140159

[51] Int. Cl.$^6$ ............... C08F 1/00; C08F 1/04; C08F 1/02

[52] U.S. Cl. ................ 530/210; 530/215; 530/216

[58] Field of Search ............... 530/210, 216, 530/215; 52/602

[56] References Cited

U.S. PATENT DOCUMENTS

| | | | |
|---|---|---|---|
| 3,313,754 | 4/1967 | Logan | 530/216 |
| 3,664,981 | 5/1972 | Mahlman | 530/216 |
| 4,248,770 | 2/1981 | Matsuo et al. | 530/21 |
| 4,302,371 | 11/1981 | Matsuo et al. | 530/210 |
| 4,447,354 | 5/1984 | Scharrer et al. | 530/210 |
| 4,643,848 | 2/1987 | Thomas et al. | 260/104 |
| 4,847,010 | 7/1989 | Maeda et al. | 530/216 |
| 4,906,733 | 3/1990 | Kodama et al. | 530/216 |
| 5,175,250 | 12/1992 | Hazen | 530/213 |
| 5,387,669 | 2/1995 | Maeda et al. | 530/216 |
| 5,395,920 | 3/1995 | Maeda et al. | 530/210 |

FOREIGN PATENT DOCUMENTS

| | | |
|---|---|---|
| 0121125 | 10/1984 | European Pat. Off. . |
| 1541122 | 10/1968 | France . |
| 2429248 | 1/1980 | France . |
| 46-007549 | 2/1971 | Japan . |
| 467549 | 2/1975 | Japan . |
| 60-81269 | 5/1985 | Japan . |
| 64-85265 | 3/1989 | Japan . |

*Primary Examiner*—Nathan M. Nutter
*Attorney, Agent, or Firm*—Varndell Legal Group

[57] ABSTRACT

A process for preparing colorless rosins characterized by dehydrogenating purified hydrogenated rosins in the presence of a dehydrogenating catalyst. The colorless rosins obtained according to the process of the present invention are nearly colorless in appearance, odorless and excellent in stabilities, particularly are excellent in various properties such as odor, stabilities and compatibility in a heated state. Accordingly the above-mentioned colorless rosins are suitably used not only as modifiers for soap-type cleaning compositions, but also as emulsifiers for synthetic rubbers and emulsion polymerization in the form of alkali metal salts thereof. The esterified colorless rosins are suitably used as tackifiers for hotmelt-type adhesives, modifiers for rubbers and various plastics, starting materials for traffic paints, base materials for chewing gums, modifiers for inks and paints, coating agents for pigments, fluxes for solders, and the like, and thus the commercial values of final products for those uses can be increased.

16 Claims, No Drawings

PROCESS FOR PREPARING COLORLESS ROSINS

TECHNICAL FIELD

The present invention relates to a process for preparing colorless rosins which are colorless, odorless and excellent in heat stability and weatherability.

BACKGROUND ARTS

Conventionally, rosins and their derivatives, i.e., rosin esters are used as tackifiers for adhesives or pressure sensitive adhesives, modifiers for rubbers or plastics, resins for traffic paints, sizes for paper making, emulsifiers for synthetic rubbers, resin materials for inks and resins for paints, and the like. The above-mentioned rosin compounds are insufficient in views of their yellow or yellowish brown color, odor, and heat stability and weatherability (hereinafter both properties may be sometimes referred to as "stabilities").

In order to solve the defects of the rosin compounds, there have been commercially available, for example, disproportionated rosins which are improved in heat stability by disproportionation of raw rosins, hydrogenated rosins which are improved in the stabilities to a certain extent by hydrogenating raw rosins, or esterified rosins prepared by using the disproportionated rosins or the hydrogenated rosins. Those are, however, insufficient in views of color and stabilities.

There is described in JP-B-33771/1970 and JP-B-20599/1974 a process for disproportionation of rosins or rosin compounds with the particular organic sulfur compounds. The disproportionated rosins obtained according to that process are, however, insufficient in views of color, odor and stabilities.

As mentioned above, every conventional rosin, disproportionated rosin and hydrogenated rosin cannot simultaneously satisfy all the properties, i.e., color, odor and stabilities. Accordingly, it has been desired to produce colorless and odorless rosins having good stabilities.

An object of the present invention is, considering the above circumstances, to provide a novel process for producing colorless rosins which are improved in the properties of color, odor and stabilities of the conventional rosins.

DISCLOSURE OF THE INVENTION

As a result of studying to improve the above-mentioned properties in views of various conditions such as kind of rosins, purification operation and dehydrogenation reaction, a novel process for preparing colorless rosins which are in compliance with the object of the present invention, i.e., colorless, odorless and excellent in stabilities was found in which purified hydrogenated rosins are used as starting materials and are subjected to the specific reaction step, and then the present invention has been completed.

Namely, the present invention relates to a process for preparing colorless rosins characterized in that purified hydrogenated rosins are subjected to the specific reaction step, i.e., to dehydrogenation reaction in the presence of a dehydrogenating catalyst. According to the novel process, there can be provided the colorless rosins which are almost colorless in appearance, and have less odor at heating and are excellent in stabilities. The colorless rosins obtained by the process possess properties which are unexpected from the general concept derived from the conventional rosins. Namely, according to the present invention, the almost colorless rosins can be obtained, nevertheless there is the general concept that the appearance of rosins is yellow or yellowish brown. Further, the above-mentioned rosins can maintain good compatibility with various polymers which is the characteristic property of the conventional rosins.

PREFERRED EMBODIMENTS OF THE INVENTION

The starting materials of the present invention are the purified hydrogenated rosins. By using such rosins, the finally obtained rosins are made colorless, odorless and excellent in stabilities.

The purified hydrogenated rosins means ones obtained by partially or substantially completely hydrogenating gum rosins, wood rosins or tall oil rosins which contain mainly a resin acid such as abietic acids, palustric acids, neoabietic acids, pimaric acids, isopimaric acids and dehydroabietic acid and then purifying them (hereinafter referred to as "purified hydrogenated rosins A"); ones obtained by purifying gum rosins, wood rosins or tall oil rosins, and then partially or substantially completely hydrogenating the purified rosins (hereinafter referred to as "purified hydrogenated rosins B").

First, explanation is directing the process of preparing the purified hydrogenated rosins A.

In the hydrogenation, known reaction conditions may be optionally determined. Namely, the crude hydrogenated rosins may be, for example, prepared by heating crude rosins under a hydrogen pressure of usually 10 to 200 kg/cm$^2$, preferably 50 to 150 kg/cm$^2$ in the presence of a hydrogenating catalyst. As the hydrogenating catalysts, there may be employed, for example, catalysts on carrier such as palladium on carbon, rhodium on carbon and platinum on carbon, metal powders such as nickel and platinum, iodine, iodides such as iron iodide, and the like. An amount of the catalyst is usually 0.01 to 5% by weight, preferably 0.01 to 1.0% by weight to the rosin, and a reaction temperature is 100° to 300° C., preferably 150° to 290° C.

The resin acid in the crude hydrogenated rosins prepared according to the conditions of the above hydrogenation reaction varies a little with an amount of the hydrogenating catalyst and a pressure of fed hydrogen gas, and comprises usually less than 1% by weight of abietic acid, 10 to 50% by weight of its tetrahydro derivative, 45 to 75% by weight of its dihydro derivative, and 5 to 15% by weight of dehydroabietic acid. Particularly, when an amount of abietic acid is not less than 1% by weight, the color becomes inferior even if the subsequent purification step and dehydrogenation step are carried out. Also, when an amount of dehydroabietic acid is more than 75% by weight, there is a defect that the subsequent dehydrogenation reaction cannot be effectively proceeded.

The crude hydrogenated rosins are necessary to be purified. Herein, the purification means the removal of high molecular weight compounds derived from peroxides which are contained in the rosins before the hydrogenation or in the rosins after the hydrogenation, and removal of non-saponificated compounds which are originally contained in the rosins. Specifically, operations such as distillation, recrystallization and extraction may be effective, and in industrial scale the purification by distillation is preferred in views of workability and economical merit. In case of distillation, the conditions are optionally determined with considering a distillation period of time, usually from a temperature range of from 200° to 300° C. and a pressure range of from 1 to 10 mmHg. The recrystallization may be carried out by, for example, dissolving the crude hydrogenated rosins in a good solvent, then distilling off a part of the solvent to prepare a concentrated solution, and pouring the solution to a poor solvent. Examples of the good solvents are aromatic hydrocarbons such as benzene, toluene and xylene, halogenated hydrocarbons such as chloroform, lower alcohols such as isopropyl alcohol, ketones such as acetone, acetic esters such as ethyl acetate, and the like. Examples of the poor solvent are aliphatic hydrocarbons such as n-hexane, n-heptane, cyclohexane and isooctane, and the like. In addition, as the above purification, there may be employed that the purified hydrogenated rosins A can be obtained by preparing an aqueous alkaline solution of the crude hydrogenated rosins with using an alkali such as sodium hydroxide or potassium hydroxide, extracting insoluble non-saponified compounds with an organic solvent, neutralizing the aqueous layer to give the rosins A from the aqueous layer.

The purification in the present invention can give the desired degree of purification by, in case of distillation, removing the initially distilled portion in an amount of around 2 to 5% by weight, and residual portion in an amount of around 5 to 10% by weight.

Next, the preparation process of the purified hydrogenated rosins B is explained. The crude rosins may be purified and then hydrogenated to obtain the rosins B. As the purification conditions and the hydrogenation conditions, the conditions similar to those for the purified hydrogenated rosins A may be employed.

According to the present invention, it is necessary to subject the purified hydrogenated rosins A and B to the dehydrogenation reaction. The dehydrogenation conditions are not particularly limited, and usual conditions may be employed. For example, the purified hydrogenated rosins may be heated, in a sealed vessel, e.g., a pressure resistive vessel, under an initial hydrogen pressure range of less than 10 kg/cm$^2$, preferably less than 5 kg/cm$^2$ and a reaction temperature range of from 100° to 300° C., preferably 200° to 280° C. in the presence of a dehydrogenating catalyst. Though the hydrogen gas is not essentially required because of dehydrogenation reaction, from the aim to utilize the purified hydrogen for reduction of the peroxide, as explained above, the initial pressure of the hydrogen gas is set to a pressure of less than 10 kg/cm$^2$. The pressure may be controlled by the self-pressure of the hydrogen produced in the disproportionation or the external supply of a small amount of hydrogen gas. In order to accelerate the dehydrogenation reaction, the initial pressure of hydrogen gas is set to a pressure of less than 5 kg/cm$^2$. When the reaction temperature is lower than 100° C., the dehydrogenation reactivity tends to be lowered, and when more than 300° C., there is a possibility that the rosins may be decomposed.

The dehydrogenating catalyst is not particularly limited, and there can be used various known catalysts. Examples are, for instance, palladium type catalysts, rhodium type catalysts, platinum type catalysts, and the like, and those may be used in the form of being carried on usual carriers such as silica and carbon. An amount of the catalyst to be used is 0.01 to 5% by weight, preferably 0.02 to 2% by weight to the purified hydrogenated rosins.

When the amount of the catalyst is less than 0.01 by weight, the dehydrogenation reaction tends to be insufficient, and when more than 5% by weight, the economical merit becomes lower. In the dehydrogenation reaction, there may be optionally used reaction mediums such as alicyclic hydrocarbons such as cyclohexane and decalin, and aromatic hydrocarbons such as toluene and xylene.

The composition of resin acids in the colorless rosins prepared by the process of the present invention may vary a little with the fed hydrogen gas pressure, and is less than 1% of abietic acid, 10 to 50% by weight of tetrahydro body, 10 to 40% by weight of dihydro body, and 20 to 60% by weight of dehydroabietic acid. The obtained rosins have a value of peroxide of not more than 1.

In the above composition of resin acids, particularly when an amount of abietic acid is not less than 1% by weight, the final rosins are not colorless, and when an amount of dehydroabietic acid is more than 60% by weight, though colorless rosins can be obtained, the resulting rosins tend to be inferior in operability due to their high crystallinity.

In the followings, the process for preparing the colorless rosins of the present invention is specifically explained on the basis of Examples and Comparative Examples, and the present invention is not limited thereto.

EXAMPLE 1

(1) Hydrogenation reaction

An autoclave of 3 liters was charged with 1000 g of a crude gum rosin (from China) having an acid value of 171, a softening point of 76° C. and color 6 on Gardner scale and 2 g of a palladium on carbon (palladium content 5%, water content 50%) as the hydrogenating catalyst. After removing oxygen in the system, a pressure in the system was elevated to 100 kg/cm$^2$ by hydrogen, and then a temperature of the system was raised to 260° C. with stirring. The hydrogenation reaction was carried out for three hours at that temperature to obtain a crude hydrogenated rosin having an acid value of 167, a softening point of 74° C. and color 5 on Gardner scale.

(2) Purification

The crude hydrogenated rosin was distilled under a nitrogen atmosphere of 3 mmHg. Among the fractions shown in Table 1, the main fraction having an acid value of 175.2, a softening point of 83° C. and color 2 on Gardner scale was employed as a purified hydrogenated rosin.

TABLE 1

| | Distilling temp. (°C.) | Distilling tower temp. (°C.) | Yield (%) | Acid value |
|---|---|---|---|---|
| Initial fraction | less than 195 | less than 210 | 3.5 | 51.2 |
| Main fraction | 195 to 250 | 210 to 280 | 89.1 | 175.2 |
| Residue | not less than 250 | not less than 280 | 7.4 | 45.6 |

(3) Dehydrogenation reaction

An autoclave of 1 liter with a vibrator was charged with 200 g of the purified hydrogenated rosin and 0.1 g of a palladium on carbon (palladium content 5%, water content 50%), and the oxygen in the system was removed by replacing with nitrogen, then a temperature in the system was raised to 250° C. The dehydrogenation reaction was carried out for three hours at that temperature under a pressure of 5 kg/cm$^2$ to obtain a colorless rosin having an acid value of 172.6, a softening point of 84° C. and color not more than 1 on Gardner scale (Color 80 on Hazen scale). The resulting colorless rosin was subjected to the following tests. The results are shown in Tables 4 and 5.

(Composition of resin acids in rosin)

Each rosin of before and after the dehydrogenation reaction was determined by gas chromatography according to ASTM D3008-82.

(Heat stability)

A test tube of 1.5 cm inner diameter and 15 cm height was charged with 10 g of a sample, and the test tube without sealing was placed in a 200° C. air circulating dryer. Evaluation was done in view of change color (Gardner) with lapse of time.

(Weatherability)

An ointment can of 5.6 cm inner diameter and 1 cm height was charged with 2.0 g of a resin having a uniform particle size of 60 to 100 meshes. Increase in weight (absorption of oxygen) and change in color (Gardner) were observed after irradiating the resin for 15 hours with a mercury lamp of 400 W at a distance of 40 cm. The evaluation of the color. was carried out by using 50% toluene solution.

Example 2

(1) Hydrogenation reaction

The same hydrogenation reaction as in Example 1(1) was carried out excepting changing the amount of the palladium on carbon (palladium content 5%, water content 50%) to 0.7 g to obtain a crude hydrogenated rosin having an acid value of 169, a softening point of 75° C. and color 6 on Gardner scale.

(2) Purification

The crude hydrogenated rosin was distilled under a reduced pressure in the same manner as in Example 1(2) to obtain the fractions shown in Table 2. The main fraction having an acid value of 175.5, a softening point of 85.5° C. and color 2–3 on Gardner scale was employed as a purified hydrogenated rosin.

(3) Dehydrogenation reaction 200 g of the purified hydrogenated rosin was dehydrogenated under the same conditions as in Example 1(3) to obtain a colorless rosin having an acid value of 171.1, a softening point of 85° C. and color not more than 1 on Gardner scale (Color 100 on Hazen scale). The resulting rosin was subjected to the same tests as in Example 1. The results are shown in Tables 4 and 5.

Comparative Example 1

The crude hydrogenated rosin obtained in Example 1(1) was dehydrogenated under the same conditions as in Example 1(3) to obtain a rosin having an acid value of 165, a softening point of 75° C. and color 5 on Gardner scale. The resulting rosin was subjected to the same tests as in Example 1. The results are shown in Tables 4 and 5.

Comparative Example 2

The rosin obtained in Comparative Example 1 was distilled in a nitrogen sealed atmosphere under a reduced pressure of 3 mmHg to obtain the fractions shown in Table 3. The main fraction having an acid value of 173.7, a softening point of 84° C. and color 2 on Gardner scale was employed as the final rosin. The final rosin was subjected to the same tests as in Example 1. The results are shown in Tables 4 and 5.

TABLE 2

|  | Distilling temp. (°C.) | Distilling tower temp. (°C.) | Yield (%) | Acid value |
| --- | --- | --- | --- | --- |
| Initial fraction | less than 195 | less than 210 | 4.0 | 53.0 |
| Main fraction | 195 to 250 | 210 to 280 | 88.4 | 175.5 |
| Residue | not less than 250 | not less than 280 | 7.6 | 47.2 |

TABLE 3

|  | Distilling temp. (°C.) | Distilling tower temp. (°C.) | Yield (%) | Acid value |
| --- | --- | --- | --- | --- |
| Initial fraction | less than 195 | less than 210 | 3.5 | 54.5 |
| Main fraction | 195 to 250 | 210 to 280 | 88.7 | 173.7 |
| Residue | not less than 250 | not less than 280 | 7.8 | 48.1 |

TABLE 4

|  | Before dehydrogenation Comp. of rosin acids (wt %) | | | After dehydrogenation Comp. of rosin acids (wt %) | | |
| --- | --- | --- | --- | --- | --- | --- |
|  | Tetrahydro-body | Dihydro-body | Dehydro-body | Tetrahydro-body | Dihydro-body | Dehydro-body |
| Ex. 1 | 41.2 | 50.8 | 8.0 | 41.8 | 13.6 | 44.6 |
| Ex. 2 | 27.0 | 64.8 | 8.2 | 31.5 | 19.3 | 49.2 |
| Com. Ex. 1 | 41.2 | 50.8 | 8.0 | 41.4 | 41.3 | 17.3 |
| Com. Ex. 2 | 41.2 | 50.8 | 8.0 | 41.6 | 41.2 | 17.2 |

TABLE 5

|  | Heat Stability | | | Weatherability | | |
| --- | --- | --- | --- | --- | --- | --- |
|  | | After | After | After | Oxygen absorption | Tone Change | |
|  | 0 hr. | 4 hrs. | 10 hrs. | 24 hrs. | amount (wt %) | 0 hr. | After 15 hrs. |
| Ex. 1 | ≦1 | 2 | 5 | 7 | 0.10 | ≦1 | 1–2 |
| Ex. 2 | ≦1 | 2 | 5 | 8 | 0.11 | ≦1 | 2 |
| Com. Ex. 1 | 5 | 8 | 10 | 12 | 0.65 | 4 | 6 |
| Com. Ex. 2 | 2 | 4 | 7 | 10 | 0.47 | 2 | 4 |

As mentioned above, the rosins having excellent various properties, which are the object of the present invention, cannot be obtained when the crude hydrogenated rosin is subjected to only the dehydrogenation reaction, or when the crude hydrogenated rosin is dehydrogenated and then purified.

Therefore, according to the present invention, the colorless rosins remarkably improved in various properties such as color, odor and stabilities in comparison with conventional rosins can be provided at a relatively low cost.

INDUSTRIAL APPLICABILITY

The colorless rosins prepared according to the process of the present invention are nearly colorless in appearance, odorless and excellent in stabilities, particularly are excellent in various properties such as odor, stabilities and compatibility in a heated state. Accordingly the above-mentioned colorless rosins are suitably used not only as modifiers for soap-type cleaning compositions, but also as emulsifiers for synthetic rubbers and emulsion polymerization in the form of alkali metal salts thereof. The esterified colorless rosins are suitably used as tackifiers for hotmelt-type adhesives, modifiers for rubbers and various plastics, starting materials for traffic paints, base materials for chewing gums, modifiers for inks and paints, coating agents for pigments, fluxes for solders, and the like, and thus the commercial values of final products for those uses can be increased.

We claim:

1. A process for preparing colorless rosins, characterized by dehydrogenating purified hydrogenated rosins in the presence of a dehydrogenating catalyst.

2. The process for preparing colorless rosins of claim 1, wherein the dehydrogenating catalyst is at least one of palladium catalysts, rhodium catalysts and platinum catalysts.

3. The process for preparing colorless rosins of claim 1, wherein hydrogen pressure in a reaction system the for dehydrogenation reaction is less than 10 kg/cm$^2$.

4. The process for preparing colorless rosins of claim 2, wherein hydrogen pressure in a reaction system for the dehydrogenation reaction is less than 10 kg/cm$^2$.

5. The process for preparing colorless rosins of claim 1, wherein said purified hydrogenated rosins are obtained by separate steps of hydrogenating crude rosins and purifying resulting hydrogenated crude rosins that are carried out before said dehydrogenating.

6. The process for preparing colorless rosins of claim 1, wherein said purified hydrogenated rosins are obtained by separate steps of purifying crude rosins and hydrogenating resulting purified rosins that are carried out before said dehydrogenating.

7. A process for preparing colorless rosins comprising a step of dehydrogenating purified hydrogenated rosins in the presence of a dehydrogenation catalyst, said step essentially free from hydrogenating said purified hydrogenated rosins.

8. A process for preparing colorless rosins according to claim 7, wherein said dehydrogenation catalyst is at least one of palladium catalyst, rhodium catalyst and platinum catalyst.

9. The process for preparing colorless rosins according to claim 7, wherein hydrogen pressure in a reaction system for said step is less than 10 kg/cm$^2$.

10. The process for preparing colorless rosins according to claim 8, wherein hydrogen pressure in a reaction system for said step is less than 10 kg/cm$^2$.

11. The process for preparing colorless rosins according to claim 7, wherein separate steps of hydrogenating crude rosins and purifying resulting hydrogenated crude rosins to obtain said purified hydrogenated rosins are carried out before said step of dehydrogenating.

12. The process for preparing colorless rosins according to claim 7, wherein separate steps of purifying crude rosins and hydrogenating resulting purified crude rosins to obtain said purified hydrogenated rosins are carried out before said step of dehydrogenating.

13. The process for preparing colorless rosins according to claim 1, wherein said purified hydrogenated rosins are prepared by purifying crude hydrogenated rosins having 10 to 50% by weight of tetrahydroabietic acid, 45 to 75% by weight of dihydroabietic acid, and 5 to 15% by weight of dehydroabietic acid.

14. The process for preparing colorless rosins according to claim 2, wherein said purified hydrogenated rosins are prepared by purifying crude hydrogenated rosins having 10 to 50% by weight of tetrahydroabietic acid, 45 to 75% by weight of a dihydroabietic acid, and 5 to 15% by weight of dehydroabietic acid.

15. The process for preparing colorless rosins of claim 5, wherein said hydrogenated crude rosins contain 10 to 50% by weight of tetrahydroabietic acid, 45 to 75% by weight of a dihydroabietic acid, 5 to 15% by weight of dehydroabietic acid.

16. The process for preparing colorless rosins of claim 7, wherein said purified hydrogenated rosins are prepared by purifying crude hydrogenated rosins having 10 to 50% by weight of tetrahydroabietic acid, 45 to 75% by weight of a dihydroabietic acid, and 5 to 15% by weight of dehydroabietic acid.

* * * * *